United States Patent
Shiozaki et al.

(10) Patent No.: US 9,596,526 B2
(45) Date of Patent: Mar. 14, 2017

(54) WAVELENGTH SELECTIVE SWITCH

(71) Applicant: Sumitomo Electric Industries, Ltd., Osaka-shi (JP)

(72) Inventors: Manabu Shiozaki, Yokohama (JP); Kenichiro Takahashi, Yokohama (JP); Hidehisa Tazawa, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/730,529

(22) Filed: Jun. 4, 2015

(65) Prior Publication Data

US 2015/0358699 A1  Dec. 10, 2015

(30) Foreign Application Priority Data

Jun. 5, 2014  (JP) .................................. 2014-116705
Jun. 5, 2014  (JP) .................................. 2014-116709

(51) Int. Cl.

| | | |
|---|---|---|
| *G02B 5/04* | (2006.01) | |
| *H04Q 11/00* | (2006.01) | |
| *G02B 6/35* | (2006.01) | |
| *G02B 6/293* | (2006.01) | |

(52) U.S. Cl.
CPC ......... *H04Q 11/0005* (2013.01); *G02B 6/356* (2013.01); *G02B 6/29373* (2013.01); *G02B 6/3512* (2013.01); *H04Q 2011/0016* (2013.01); *H04Q 2011/0026* (2013.01)

(58) Field of Classification Search
CPC .... G02B 6/105; G02B 6/2931; G02B 6/2713; G02B 6/356; G02B 6/3512; G02B 6/29373; H04Q 2011/0016; H04Q 2011/0026; H04Q 11/0005

USPC ..................................... 359/831; 385/11, 36
See application file for complete search history.

(56) References Cited

U.S. PATENT DOCUMENTS

| | | | |
|---|---|---|---|
| 6,882,775 B1 * | 4/2005 | Peng .................... | G02B 6/2931 |
| | | | 385/36 |
| 7,397,980 B2 | 7/2008 | Frisken | |
| 7,709,354 B2 * | 5/2010 | Stowe .................. | G02B 6/2713 |
| | | | 438/118 |

FOREIGN PATENT DOCUMENTS

| | | |
|---|---|---|
| JP | 2009-003170 A | 1/2009 |
| JP | 4445373 B2 | 4/2010 |
| JP | 4500720 B2 | 7/2010 |
| JP | 2010-237377 A | 10/2010 |

(Continued)

*Primary Examiner* — Euncha Cherry
(74) *Attorney, Agent, or Firm* — Venable LLP; Michael A. Sartori; F. Brock Riggs (57) ABSTRACT

A wavelength selective switch includes a dispersion optical system dispersing wavelength multiplexing light obtained by multiplexing the plurality of frequency components to the plurality of frequency components by giving a dispersion angle having nonlinear frequency dependency to each of a plurality of frequency components; a light deflection element deflecting the plurality of frequency components; a condensing element condensing the plurality of frequency components on the light deflection element; and a prism optical system optically coupled to the dispersion optical system and the condensing element, and adapting spatial positions of the frequency components incident on the light deflection element to change linearly for frequencies by linearizing the frequency dependency of the dispersion angles and making incident the plurality of frequency components on the condensing element.

18 Claims, 5 Drawing Sheets

(56) References Cited

FOREIGN PATENT DOCUMENTS

| | | |
|---|---|---|
| JP | 2012-145373 A | 8/2012 |
| JP | 2012-145402 A | 8/2012 |
| JP | 5166380 B2 | 3/2013 |
| WO | WO-2007/029260 A2 | 3/2007 |
| WO | WO-2012/093719 A1 | 7/2012 |
| WO | WO-2012/115077 A1 | 8/2012 |

* cited by examiner

WAVELENGTH SELECTIVE SWITCH

BACKGROUND OF THE INVENTION

Field of the Invention

The present invention relates to a wavelength selective switch.

Related Background Art

A wavelength selective switch is described in Japanese Patent No. 4445373. The wavelength selective switch includes a collimator array to be an input/output optical system, a spectroscope to disperse input wavelength multiplexing light to a wavelength component, a condensing lens to be a condensing optical system, and a micro mirror array unit to be a switching element. As the spectroscope, a diffraction grating is used. The micro mirror array unit is a micro mirror that is arranged in an array.

A wavelength selective switch is described in Japanese Patent No. 4500720. The wavelength selective switch includes a collimator array to be an input/output optical system, a beam expander, two diffraction gratings, a condensing lens, and a micro mirror array unit.

A spatial position of a wavelength component condensed by the condensing lens depends on a wavelength non-linearly. This is because a dispersion angle of each wavelength component given by the diffraction grating changes non-linearly for a frequency (wavelength). Meanwhile, in normal wavelength multiplexing optical communication, a frequency of each wavelength component is defined at an equal interval. For this reason, in the case in which micro mirrors are arranged at an equal interval in a dispersion direction of the wavelength component, if a specific wavelength component is adjusted to be incident on the center of the micro mirror, a different wavelength component is shifted from the center of the micro mirror and is incident on the micro mirror and thus, a transmission band is deteriorated.

In order to resolve such a problem, it is considered that micro mirror array units arranged at an unequal interval are used such that an interval of the micro mirrors is matched with the spatial position of the wavelength component. Thereby, each wavelength component is incident on the center of each micro mirror.

However, it is difficult to manufacture the micro mirror array unit and a manufacturing cost is high. In addition, when a spatial light modulator such as LCOS is used as a switching element, instead of the micro mirror array unit, complex control of a phase modulation pattern is necessary.

In addition, a wavelength component dispersed by a first diffraction grating transmits a second diffraction grating, so that a dispersion angle can be doubled. At this time, a length of an optical path of each wavelength component until each wavelength component is emitted from the first diffraction grating and is incident on the second diffraction grating is different and an incidence angle of each wavelength component on the second diffraction grating is also different.

For this reason, the reverse trace of an optical path of each wavelength component emitted from the second diffraction grating is not matched at a focal point of the condensing lens. Thereby, each wavelength component emitted from the condensing lens is incident on the micro mirror array at a different angle. As a result, coupling efficiency of each wavelength component in the input/output optical system is deteriorated.

In order to resolve such a problem, it is considered that each micro mirror is tilted according to a tilt of an incidence angle of each wavelength component on the micro mirror array. However, control of the micro mirror array becomes complicated. Even when the spatial light modulator is used as the switching element, the complex control of the phase modulation pattern is necessary.

SUMMARY

In order to resolve the above problem, a wavelength selective switch according to one aspect of the present invention includes: a dispersion optical system dispersing wavelength multiplexing light obtained by multiplexing the plurality of frequency components to the plurality of frequency components by giving a dispersion angle having nonlinear frequency dependency to each of a plurality of frequency components; a light deflection element deflecting the plurality of frequency components; a condensing element that condensing the plurality of frequency components on the light deflection element; and a prism optical system optically coupled to the dispersion optical system and the condensing element, and adapting spatial positions of the frequency components incident on the light deflection element to change linearly for frequencies by linearizing the frequency dependency of the dispersion angles and making incident the plurality of frequency components on the condensing element.

In order to resolve the above problem, a wavelength selective switch according to another aspect of the present invention includes: a dispersion optical system dispersing wavelength multiplexing light to a plurality of frequency components and including a plurality of dispersion elements connected in a cascade manner such that dispersion surfaces in which the plurality of frequency components are dispersed are substantially matched with each other; a light deflection element deflecting the plurality of frequency components; a condensing element condensing the plurality of frequency components on the light deflection element; and a prism optical system optically coupled to the dispersion optical system and the condensing element, and controlling optical paths of the plurality of frequency components, such that the plurality of frequency components incident on the condensing element cross each other at substantially the same crossing. A focal point of the condensing element is substantially matched with the crossing.

DESCRIPTION OF THE PREFERRED EMBODIMENTS

Hereinafter, an embodiment of a wavelength selective switch according to the present invention will be described in detail with reference to the drawings. In description of the drawings, like elements or equivalent elements are denoted by like reference numerals and overlapped description may be omitted. The present invention is not limited to the exemplary embodiment and all changes in a meaning and a range equivalent to claims are included in the present invention.

As known generally, a frequency f and a wavelength $\lambda$ of light can be converted mutually on the basis of a relation of $c=\lambda \cdot f$ (c is the velocity of light). Hereinafter, the "frequency" may be replaced by a "wavelength" and described as the "wavelength" or the "frequency" and the "wavelength" may be used for corresponding uses.

Figure 1:
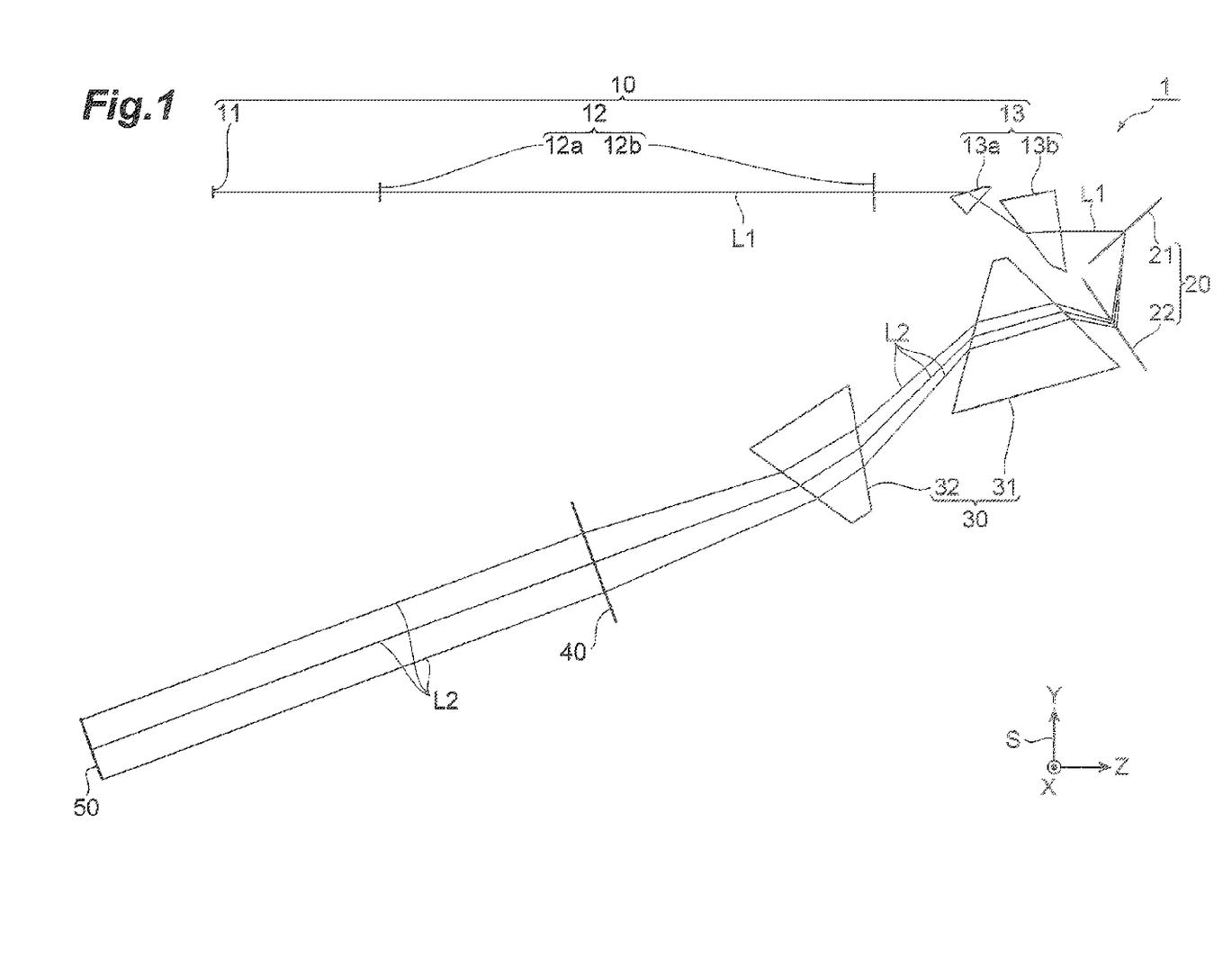
FIG. 1 is a diagram illustrating a schematic configuration of a wavelength selective switch according to an embodiment.

FIG. 1 is a diagram illustrating a schematic configuration of a wavelength selective switch according to this embodiment. An orthogonal coordinate system S is illustrated in FIG. 1. A wavelength selective switch 1 includes an input/output optical system 10, a dispersion optical system 20, a prism optical system 30, a condensing element 40, and a light deflection element 50. The input/output optical system 10 inputs wavelength multiplexing light L1 from the outside of the wavelength selective switch 1 to the dispersion optical system 20. The input/output optical system 10 receives a frequency component L2 from the dispersion optical system 20 and outputs the frequency component L2 to the outside of the wavelength selective switch 1.

The input/output optical system 10 has an input/output unit 11, a relay optical system 12, and an anamorphic optical system 13. The input/output unit 11 includes a plurality of ports arranged in an x direction and includes an input port to input the wavelength multiplexing light L1 from the outside to the wavelength selective switch 1 and an output port to output the frequency component L2 to the outside of the wavelength selective switch 1. The plurality of ports include an optical fiber and a collimate lens to be optically coupled to each other.

The relay optical system 12 optically couples the input/output unit 11 and the anamorphic optical system 13. The relay optical system 12 includes a first lens 12a and a second lens 12b. The first lens 12a receives the wavelength multiplexing light L1 input from the input/output unit 11. The first lens 12a collimates the wavelength multiplexing light L1 in an x-z plane and a y-z plane and emits the wavelength multiplexing light L1. The first lens 12a is a spherical lens of a convex shape having refractive power in the x-z plane and the y-z plane.

The second lens 12b receives the wavelength multiplexing light L1 emitted from the first lens 12a. The second lens 12b emits the wavelength multiplexing light L1 while condensing the wavelength multiplexing light L1 in the x-z plane. The second lens 12b emits the wavelength multiplexing light L1 while maintaining a progression state of the wavelength multiplexing light L1 in the y-z plane. The second lens 12b is a cylindrical lens having refractive power in only the x-z plane, for example.

The anamorphic optical system 13 receives the wavelength multiplexing light L1 emitted from the relay optical system 12. The anamorphic optical system 13 converts a beam shape of the wavelength multiplexing light L1 and emits the wavelength multiplexing light L1. For example, the anamorphic optical system 13 increases a beam size of the wavelength multiplexing light L1 in the y-z plane and converts the beam shape of the wavelength multiplexing light L1 into an elliptical shape. The anamorphic optical system 13 includes a first anamorphic prism 13a and a second anamorphic prism 13b. The wavelength multiplexing light L1 emitted from the anamorphic optical system 13 is incident on the dispersion optical system 20.

The dispersion optical system 20 receives the wavelength multiplexing light L1 emitted from the input/output optical system 10 and almost collimated in the y-z plane. The dispersion optical system 20 gives a dispersion angle according to a frequency (wavelength) to each of a plurality of frequency components (wavelength components) L2 included in the wavelength multiplexing light L1 and disperses the frequency components. The plurality of frequency components L2 are dispersed in a dispersion surface (y-z plane) crossing a port arrangement direction (x direction). The dispersion surface is a surface including a direction where the plurality of frequency components are dispersed in a dispersion element. Here, the three frequency components L2 (frequency components L21 to L23) are illustrated representatively.

The dispersion optical system 20 may include a plurality of dispersion elements and includes a first dispersion element 21 and a second dispersion element 22. Each of the first dispersion element 21 and the second dispersion element 22 is a transmission-type diffraction grating, for example. The first dispersion element 21 is arranged on a front step of the second dispersion element 22, on an optical path of a beam from the input/output optical system 10 to the light deflection element 50. The first dispersion element 21 and the second dispersion element 22 are connected in a cascade manner, such that dispersion surfaces thereof are substantially matched with each other.

When the dispersion surface of the first dispersion element 21 and the dispersion surface of the second dispersion element 22 are substantially matched with each other, this means that both the dispersion surfaces of the first dispersion element 21 and the second dispersion element 22 are arranged to become substantially the same plane (here, the y-z plane). In addition, when the first dispersion element 21 and the second dispersion element 22 are connected in a cascade manner, this means that the first dispersion element 21 and the second dispersion element 22 are sequentially arranged on the optical path of the beam from the input/output optical system 10 to the light deflection element 50 and are optically coupled to each other.

The first dispersion element 21 receives the wavelength multiplexing light L1 from the input/output optical system 10. The first dispersion element 21 gives a dispersion angle according to a frequency (wavelength) to each of the plurality of frequency components (wavelength components) L2 included in the wavelength multiplexing light L1 and disperses the plurality of frequency components L2. The second dispersion element 22 receives the plurality of frequency components L2 to which the dispersion angles have been given by the first dispersion element 21. The second dispersion element 22 further gives a dispersion angle according to a frequency to each of the plurality of frequency components L2 and emits the plurality of frequency components L2 in which the dispersion angles have been increased.

The prism optical system 30 is arranged between the dispersion optical system 20 and the condensing element 40 and is optically coupled to the dispersion optical system 20 and the condensing element 40. The prism optical system 30 may include a plurality of prisms and includes a first prism 31 and a second prism 32. The second prism 32 is arranged on a rear step of the first prism 31, on an optical path of a beam from the dispersion optical system 20 to the light deflection element 50. A function of the prism optical system 30 will be described below.

The condensing element 40 receives the plurality of frequency components L2 emitted from the prism optical system 30 and condenses the plurality of frequency components L2 in the x-z plane and the y-z plane. The condensing element 40 is a spherical lens of a convex shape having refractive power in the x-z plane and the y-z plane, for example.

The light deflection element 50 receives the plurality of frequency components L2 emitted from the condensing element 40 and deflects the plurality of frequency components L2 independently from each other. Each of the deflected frequency components L2 propagates backward along the optical elements and is coupled to a predetermined port of the input/output unit 11. The light deflection element 50 may be obtained by arranging a plurality of MEMS mirrors and may be a spatial light modulator such as LCOS.

Figure 2A:
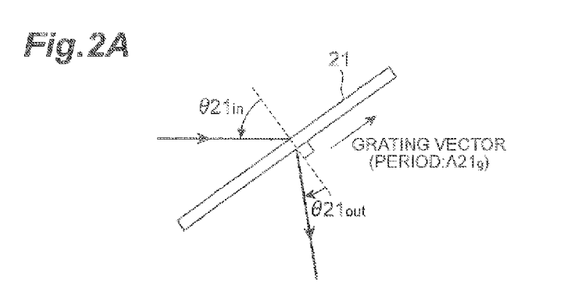
FIG. 2A is a schematic diagram of dispersion linearization.

A characteristic function of the prism optical system 30 will be described. As illustrated in FIG. 2A, a dispersion angle (emission angle) $\theta 21_{out}$ defined by a formula (1) using an incidence angle $\theta 21_{in}$ of the wavelength multiplexing light L1 is first given to the frequency component L2 by the first dispersion element 21.

[Formula 1]

$$\sin\theta 21_{out} = \sin\theta 21_{in} + \frac{m21_g \lambda}{n_0 \Lambda 21_g} \tag{1}$$

In the formula (1), $n_0$ shows a refractive index of a surrounding medium of the first dispersion element 21, $m21_g$ shows diffraction order, $\Lambda 21_g$ shows a groove period of the diffraction grating, and $\lambda$ shows a wavelength of the frequency component L2. In FIG. 2A, when an arrow moves in a counterclockwise direction, a positive angle is obtained. A dispersion angle (emission angle) defined by the same method as the formula (1) is further given to the frequency component L2 to which the dispersion angle $\theta 21_{out}$ has been given by the first dispersion element 21, by the second dispersion element 22. For this reason, the dispersion angle given to the frequency component L2 by the dispersion optical system 20 depends on the frequency non-linearly.

Meanwhile, when the prism optical system 30 is not provided, a spatial interval (channel interval P) in the dispersion surface between the frequency components L2 incident on the light deflection element 50 is represented like a formula (2).

[Formula 2]

$$P = \Delta f \cdot \frac{d\theta 22_{out}}{df} \cdot F \tag{2}$$

In the formula (2), $\Delta f$ shows a frequency interval between the frequency components L2, f shows a frequency of the frequency component L2, $\theta 22_{out}$ shows an emission angle (that is, a dispersion angle given by the dispersion optical system 20) of the frequency component L2 from the second dispersion element 22, and F shows a focal distance of the condensing element 40. The dispersion angle $\theta 22_{out}$ depends on the frequency non-linearly, similarly to the formula (1). Therefore, as illustrated by a broken line of FIG. 2B, the channel interval P of the frequency components L2 incident on the light deflection element 50 is not constant and depends on the wavelength (frequency) non-linearly.

The wavelength selective switch 1 includes the prism optical system 30 between the dispersion optical system 20 and the condensing element 40. The prism optical system 30 makes effective dispersion angles of the plurality of frequency components L2 depend on the frequencies linearly (hereinafter, this function may be referred to as dispersion linearization). As illustrated in FIG. 2C, the first prism 31 has a first surface 31a and a second surface 31b. The first surface 31a and the second surface 31b define a vertex angle $\theta 31_p$ of the first prism 31.

The frequency component L2 to which the dispersion angle $\theta 22_{out}$ has been given by the dispersion optical system 20 is incident on the first surface 31a and is emitted from the second surface 31b. If an incidence angle of the frequency component L2 incident on the first surface 31a is set as $\theta 31_{in}$, an emission angle of the frequency component L2 emitted from the first surface 31a is set as $\theta'31_{in}$, and an incidence angle of the frequency component L2 incident on the second surface 31b is set as $\theta'31_{out}$, an emission angle $\theta 31_{out}$ of the frequency component L2 emitted from the first prism 31 (second surface 31b) is defined by formulas (3) to (5).

[Formula 3]

$$n31_p \sin \theta'31_{in} = n_0 \sin \theta 31_{in} \tag{3}$$

[Formula 4]

$$\theta'31_{out} = \theta'31_{in} \theta 31_p \tag{4}$$

[Formula 5]

$$n_0 \sin \theta 31_{out} = n31_p \sin \theta'31_{out} \tag{5}$$

In the formulas (3) to (5), $n_0$ shows a refractive index of a surrounding medium of the first prism 31 and $n31_p$ shows a refractive index of the first prism 31. As illustrated in the formulas (3) to (5), the emission angle $\theta 31_{out}$ of the frequency component L2 emitted from the first prism 31 can be set by appropriately adjusting the incidence angle $\theta 31_{in}$ of the frequency component L2 incident on the first surface 31a, the incidence angle $\theta'31_{out}$ of the frequency component L2 incident on the second surface 31b, the refractive index $n31_p$, and the vertex angle $\theta 31_p$.

When the second prism 32 is ignored, the emission angle $\theta 31_{out}$ of the frequency component L2 emitted from the first prism 31 is an effective dispersion angle defining the channel interval p illustrated by the formula (1). That is, according to the first prism 31, the effective dispersion angle of the frequency component L2 can be made to depend on the frequency linearly, by the incidence angle $\theta 31_{in}$, the incidence angle $\theta'31_{out}$, the refractive index $n31_p$, and the vertex angle $\theta 31_p$.

In addition, the first prism 31 (prism optical system 30) makes the plurality of frequency components L2, on which the dispersion linearization has been executed, incident on the condensing element 40. Thereby, as illustrated by a solid line in FIG. 2B, the first prism 31 makes the spatial position of the frequency component L2 incident on the light deflection element 50 in the dispersion surface change linearly for the frequency and makes the channel interval P substantially constant.

Figure 3A:
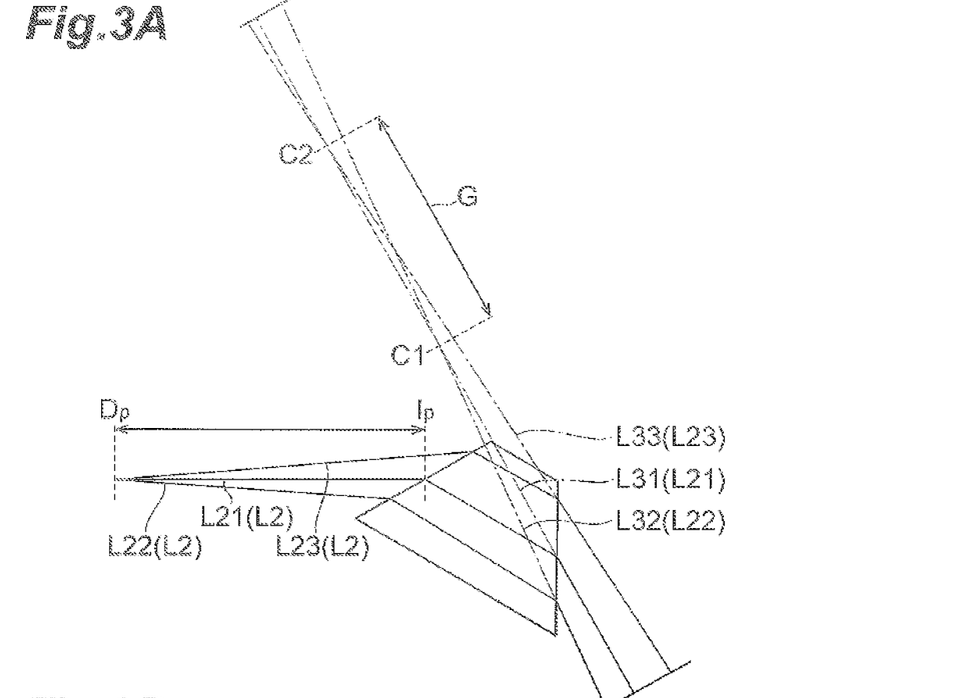
FIG. 3A is a schematic diagram of a shift of a dispersion position.

The first prism 31 may generate a shift of an effective dispersion position of each of the plurality of frequency components L2. Here, it is assumed that the dispersion optical system 20 includes only the first dispersion element 21, for simplification of description. As illustrated in FIG. 3A, a dispersion position Dp is set as a position of the wavelength multiplexing light L1 incident on the first dispersion element 21 and the plurality of frequency components L2 (here, the three frequency components L21 to L23) dispersed from the dispersion position Dp are incident on the first prism 31. A difference is generated in lengths of optical paths of the three frequency components L21 to L23 in the course of propagating through the first prism 31.

If beams of the frequency components L21 to L23 emitted from the first prism 31 are extended in a direction opposite to a progression direction (direction toward the condensing element 40) of the frequency components L21 to L23 from emission positions thereof and virtual lines L31 to L33 are drawn, the virtual lines L31 to L33 may not cross at the same point. The virtual line L31 corresponding to the frequency component L21 and the virtual line L32 corresponding to the frequency component L22 cross at a first crossing C1. The virtual line L33 corresponding to the frequency component L23 and the virtual line L31 cross at a second crossing C2. The first crossing C1 and the second crossing C2 correspond to an effective dispersion position of the frequency component L2.

The frequency components L21 to L23 pass through the first prism 31, so that the difference is generated in the lengths of the individual optical paths. As a result, the effective dispersion position is shifted (a shift G of the dispersion position is generated). In this way, the prism (first prism 31) generates the shift of the dispersion position. In a state in which the shift G of the dispersion position is generated, it is difficult to make the effective dispersion positions of the frequency components L21 to L23 matched with the focal point of the condensing element 40. For this reason, angles of the frequency components L21 to L23 incident on the light deflection element 50 through the condensing element 40 change according to the frequencies.

In this embodiment, the second prism 32 can offset the shift G of the dispersion position by the first prism 31. Specifically, a shift of a dispersion position having a sign opposite to a sign of the shift G of the dispersion position by the first prism 31 and having the same magnitude as the shift G of the dispersion position is generated by the second prism 32 to compensate for the difference of the lengths of the optical paths of the frequency components L21 to L23 generated by the first prism 31. As a result, the shifts of the dispersion positions are offset.

The first prism 31 and the second prism 32 may be arranged in directions opposite to each other to generate the shifts of the dispersion positions of the signs opposite to each other. That is, the first prism 31 and the second prism 32 are arranged such that the vertex angle of the first prism 31 and the vertex angle of the second prism 32 are at sides opposite to each other, with respect to the optical path of the frequency component L2 toward the condensing element 40 from the dispersion optical system 20.

Figure 3B:
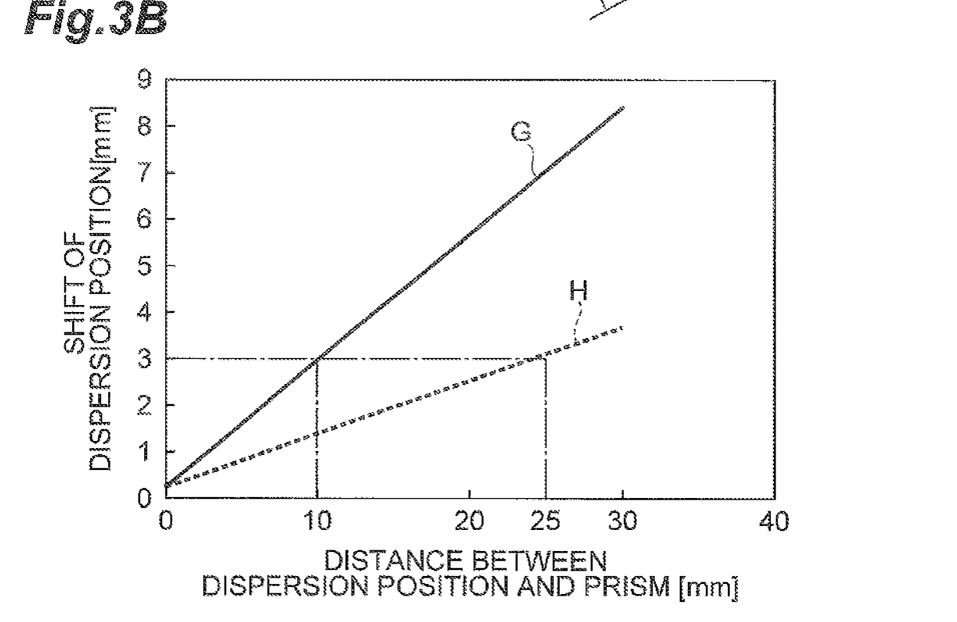
FIG. 3B is a schematic diagram of a shift of a dispersion position.

FIG. 3B is a graph illustrating a relation of a distance from the dispersion position Dp to the first prism 31 and a shift G (absolute value) of the dispersion position by the first prism 31 and a relation of a distance from the dispersion position Dp to the second prism 32 and a shift H (absolute value) of the dispersion position by the second prism 32. The distance from the dispersion position Dp to the first prism 31 is a distance between the dispersion position Dp and an incidence position Ip for the first prism 31, for the frequency component L22 of the center wavelength. The distance from the dispersion position Dp to the second prism 32 is a distance between the dispersion position Dp and an incidence position Ip for the second prism 32, for the frequency component L22 of the center wavelength, when the first prism 31 does not exist. If the distances from the dispersion position Dp to the first prism 31 and the second prism 32 increase, the shifts G and H of the dispersion positions also increase.

For example, when the first prism 31 is arranged such that the distance from the dispersion position Dp to the first prism 31 becomes about 10 mm, the shift G of the dispersion position by the first prism 31 becomes about 3 mm. Therefore, in this case, the shift H of the dispersion position by the second prism 32 may be set to become about −3 mm. That is, if the second prism 32 is arranged at a position of about 25 mm separated from a dispersion position determined by reversely extending the incidence light from the first prism 31 to the second prism 32 on the assumption that the first prism 31 does not exist, the shift G of the dispersion position is offset.

In this embodiment, the first prism 31 having the vertex angle of 59°, the incidence angle of 60°, and the refractive index of 1.75 and the second prism 32 having the vertex angle of 21.5°, the incidence angle of 40°, and the refractive index of 1.75 are used. The vertex angle of the second prism 32 is smaller than the vertex angle of the first prism 31. In addition, the incidence angle of the frequency component L2 on the second prism 32 is smaller than the incidence angle of the frequency component L2 on the first prism 31.

As such, the wavelength selective switch 1 generates the shift H of the dispersion position of the opposite sign by providing the second prism 32, for the shift G of the dispersion position generated by arranging the first prism 31 for the dispersion linearization, and offsets the shifts G and H of the dispersion positions. For example, the second prism 32 (prism optical system 30) has a first surface on which the frequency component L2 is incident and a second surface from which the frequency component L2 is emitted. The second prism 32 controls the optical paths of the plurality of frequency components L2, such that the plurality of frequency components L2 (virtual lines L31 to L33 corresponding to the frequency components L21 to L23) incident on the condensing element 40 cross each other at substantially the same crossing (that is, such that the effective dispersion positions are matched with each other), by appropriately setting an incidence angle of the frequency component L2 on the first surface, an incidence angle of the frequency component L2 on the second surface, and a refractive index. Thereby, the second prism 32 (prism optical system 30) compensates for the difference of the lengths of the optical paths between the frequency components L2 generated by the first prism 31.

In addition, the effective dispersion position and the focal point of the condensing element 40 are substantially matched with each other. Therefore, the incidence angles of the plurality of frequency components L2 incident on the light deflection element 50 through the condensing element 40 are suppressed from changing according to the frequencies.

The dispersion linearization realized by the first prism 31 may be slightly deteriorated by providing the second prism 32. In addition, the dispersion optical system 20 includes the plurality of dispersion elements (the first dispersion element 21 and the second dispersion element 22), so that the shift of the dispersion position may be generated. Therefore, the individual parameters to define the first prism 31 and the second prism 32 are preferably set to compensate for the deterioration and the shift.

An example of the individual parameters to define the dispersion optical system 20 and the prism optical system 30 and a result of the dispersion linearization and the compensation for the shift of the dispersion position are illustrated.

TABLE 1

| | | | Only dispersion element | Design using present invention |
|---|---|---|---|---|
| Diffraction grating | Type | | Transmission | Transmission |
| | Groove number | line/mm | 966 | 966 |
| | Number | | x2 | x2 |
| First prism | Refractive index | | | 1.7 |
| | Incidence angle | deg | | 59.4 |
| | Vertex angle | deg | | 60.7 |
| Second prism | Refractive index | | | 1.5 |
| | Incidence angle | deg | | 33.9 |
| | Vertex angle | deg | | 43.6 |
| Characteristic | Shift of ch interval | % | 14.8 | 0.71 |
| | Shift of dispersion position | mm | 2.63 | 0.37 |

As described above, the wavelength selective switch 1 according to this embodiment includes the dispersion optical system 20 that disperses each of the plurality of frequency components L2 according to the frequency. The dispersion angle $\theta 22_{out}$ given to each of the plurality of frequency components L2 depends on the frequency non-linearly. The wavelength selective switch 1 includes the prism optical system 30 that is optically coupled to the dispersion optical system 20. The prism optical system 30 (mainly, the first prism 31) makes the effective dispersion angle (for example, $\theta 31_{out}$) of each of the plurality of frequency components L2 depend on the frequency linearly (dispersion linearization).

The prism optical system 30 makes the plurality of frequency components L2 incident on the condensing element 40 after the dispersion linearization, so that the spatial positions of the frequency components L2 incident on the light deflection element 50 in the dispersion surface change linearly for the frequencies (the channel interval P becomes constant). For this reason, even though the dispersion angles $\theta 22_{out}$ having the nonlinear frequency dependency are given to the plurality of frequency components L2 by the dispersion optical system 20, complexity of the configuration or the control of the light deflection element 50 can be avoided.

The wavelength selective switch 1 according to this embodiment includes the dispersion optical system 20 that includes the plurality of dispersion elements (the first dispersion element 21 and the second dispersion element 22). The prism optical system 30 includes the first prism 31 for the dispersion linearization and the second prism 32. The prism optical system 30 (mainly, the second prism 32) controls the optical paths of the plurality of frequency components L2, such that the plurality of frequency components L2 (the virtual lines L31 to L33 thereof) incident on the condensing element 40 cross each other at substantially the same crossing.

The prism optical system 30 (mainly, the second prism 32) compensates for the shift of the dispersion position. The dispersion position is shifted due to including the plurality of dispersion elements (the first dispersion element 21 and the second dispersion element 22) in the dispersion optical system 20 and including the first prism 31 for the dispersion linearization in the prism optical system 30. For example, mainly, the second prism 32 compensates for the difference of the lengths of the optical paths between the frequency components L2 generated in the first prism 31, such that the plurality of frequency components L2 incident on the condensing element 40 cross each other at substantially the same crossing (effective dispersion position).

The focal point of the condensing element 40 and the effective dispersion position are substantially matched with each other. For this reason, the incidence angles of the plurality of frequency components L2 incident on the light deflection element 50 through the condensing element 40 are suppressed from changing according to the frequencies.

The first prism 31 and the second prism 32 are arranged in directions opposite to each other, for the optical paths of the plurality of frequency components L2. Thereby, both the dispersion linearization and the compensation for the shift of the dispersion position in the prism optical system 30 are realized.

The vertex angle of the second prism 32 is smaller than the vertex angle of the first prism 31. The incidence angle of the frequency component L2 on the second prism 32 is smaller than the incidence angle of the frequency component L2 on the first prism 31. Thereby, the dispersion position generated by the first prism 31 is easily offset by the second prism 32.

As the first dispersion element 21 and the second dispersion element 22 of the dispersion optical system 20, transmission-type diffraction gratings may be used. Thereby, the light (wavelength multiplexing light L1) incident on the dispersion optical system 20 can be avoided from overlapping the prism optical system 30.

The embodiment is used to describe one example of the wavelength selective switch according to the present invention. Therefore, the wavelength selective switch according to the present invention is not limited to the wavelength selective switch 1 described above. The wavelength selective switch according to the present invention includes wavelength selective switches obtained by arbitrarily changing the wavelength selective switch 1 without departing from the scope of claims.

Figure 4A:
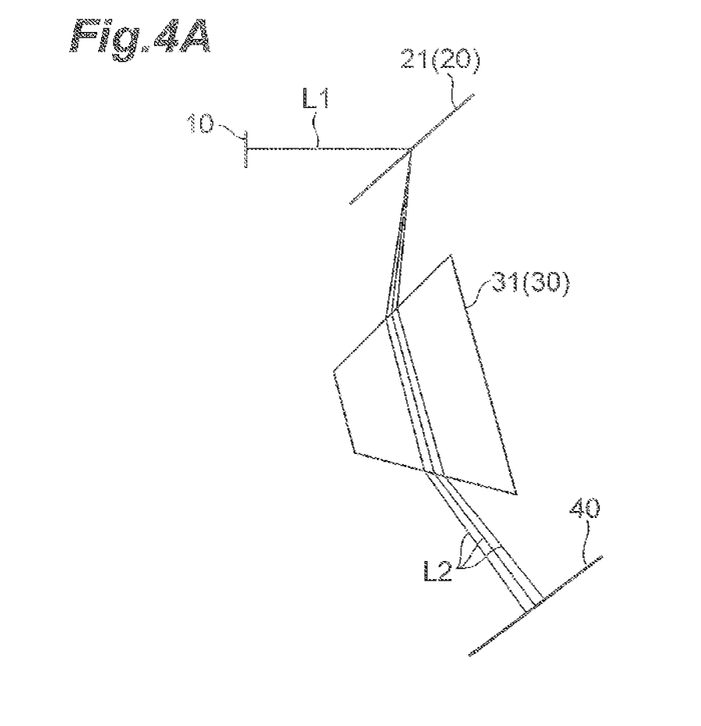
FIG. 4A is a diagram illustrating a schematic configuration of a wavelength selective switch according to a modification.

For example, as illustrated in FIG. 4A, the wavelength selective switch 1 may include the dispersion optical system 20 including only a single dispersion element (here, the first dispersion element 21) and the prism optical system 30 including only a single prism (here, the first prism 31). In this case, the prism optical system 30 in which the dispersion linearization is enabled can be configured.

Figure 4B:
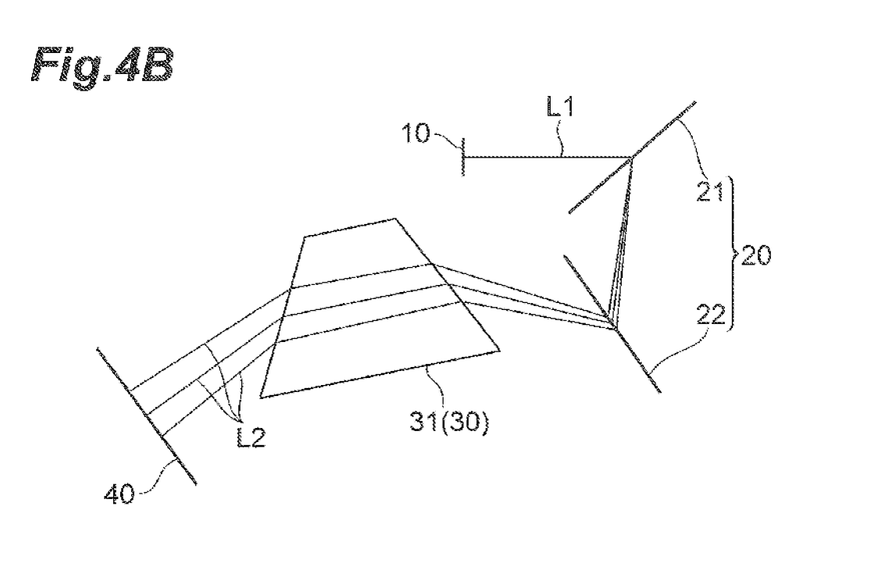
FIG. 4B is a diagram illustrating a schematic configuration of a wavelength selective switch according to a modification.

In addition, as illustrated in FIG. 4B, the wavelength selective switch 1 may include the dispersion optical system 20 including a plurality of dispersion elements (here, the first dispersion element 21 and the second dispersion element 22) and the prism optical system 30 including only a single prism (here, the first prism 31). In this case, the prism optical system 30 in which the dispersion linearization is enabled can be configured.

Figure 5:
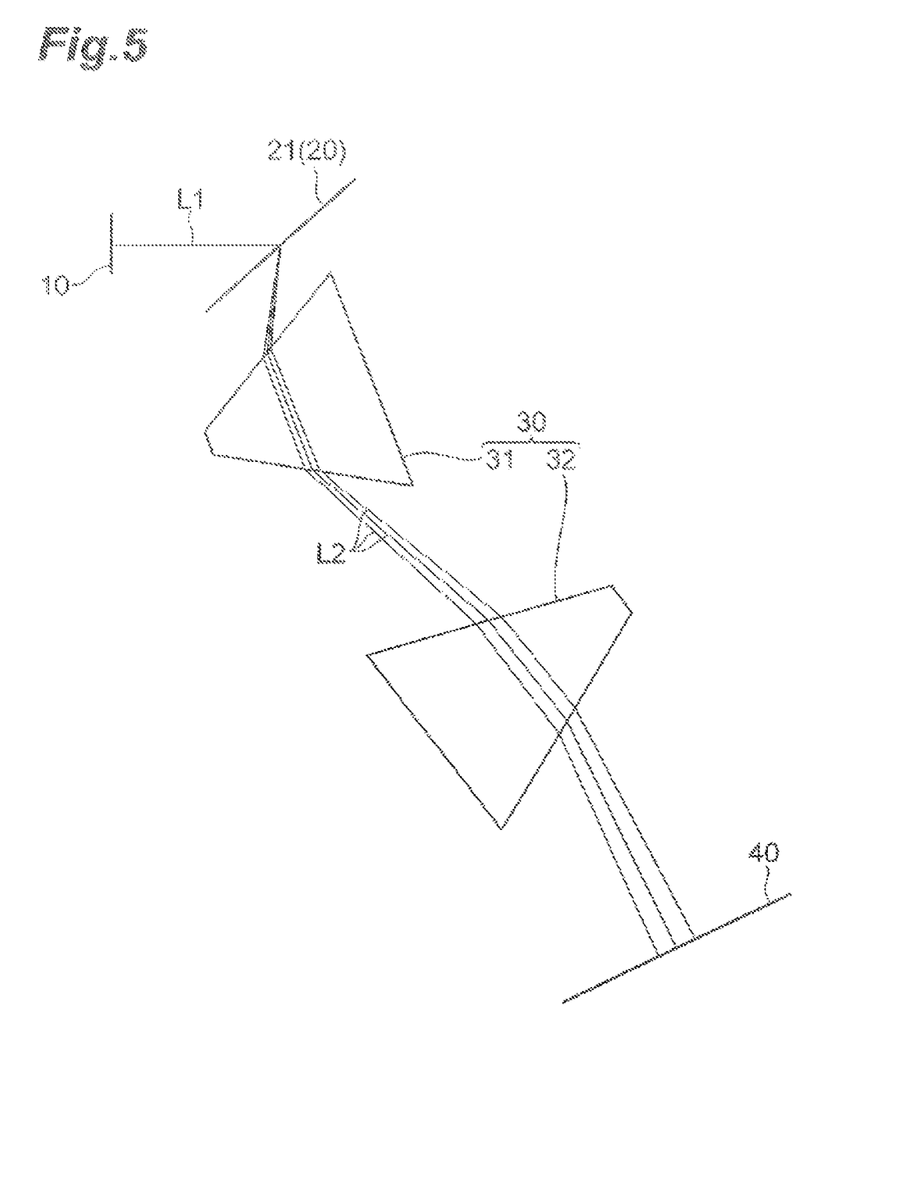
FIG. 5 is a diagram illustrating a schematic configuration of a wavelength selective switch according to a modification.

In addition, as illustrated in FIG. 5, the wavelength selective switch 1 may include the dispersion optical system 20 including only a single dispersion element (here, the first dispersion element 21) and the prism optical system 30 including a plurality of prisms (here, the first prism 31 and the second prism 32). In this case, the prism optical system 30 in which the dispersion linearization and the compensation for the shift of the dispersion position are enabled can be configured.

Here, if the first dispersion element 21 illustrated in FIG. 2A is focused on, temperature dependency of the emission angle $\theta 21_{out}$ thereof is represented by a formula (6). In the formula (6), T shows a temperature. $M21_g$ in the formula (6) is represented by a formula (7). In addition, $D21_g$ in the formula (6) is represented by a formula (8).

[Formula 6]

$$\frac{d\theta 21_{out}}{dT} = \frac{1}{M21_g}\frac{d\theta 21_{in}}{dT} - D21_g \lambda \left\{ \frac{1}{n_0 \Lambda 21_g} \frac{d}{dT}(n_0 \Lambda 21_g) \right\} \quad (6)$$

[Formula 7]

$$M21_g = \frac{\cos\theta 21_{out}}{\cos\theta 21_{in}} \quad (7)$$

[Formula 8]

$$D21_g = \frac{m21_g}{n_0 \Lambda 21_g \cos\theta 21_{out}} \quad (8)$$

Figure 2B:
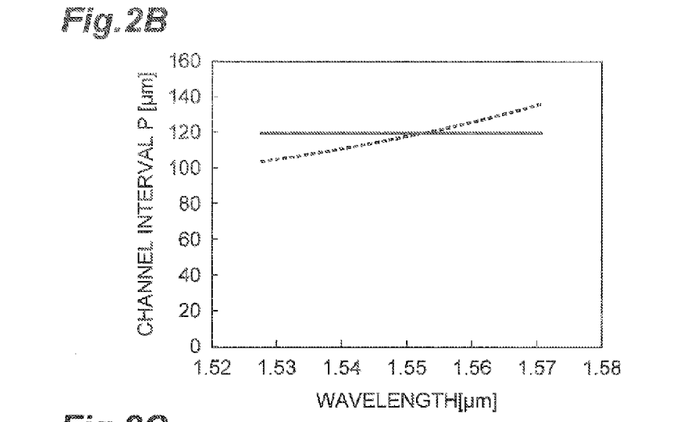
FIG. 2B is a schematic diagram of dispersion linearization.
Figure 2C:
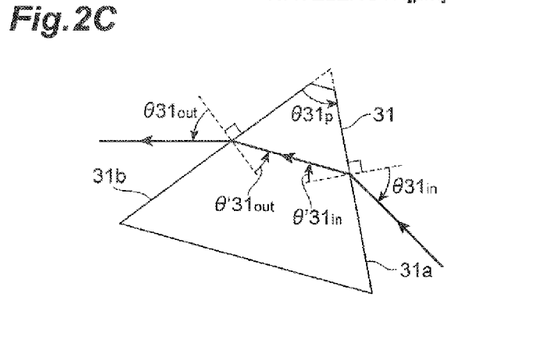
FIG. 2C is a schematic diagram of dispersion linearization.

Meanwhile, if the first prism 31 illustrated in FIG. 2B is focused on, temperature dependency of the emission angle $\theta 31_{out}$ thereof is represented by a formula (9). $M31_p$ in the formula (9) is represented by a formula (10).

[Formula 9]

$$\frac{d\theta 31_{out}}{dT} = \frac{1}{M31_p}\frac{d\theta 31_{in}}{dT} + \frac{\sin\theta 31_p}{\cos\theta' 31_{in}\cos\theta 31_{out}}\frac{d}{dT}\left(\frac{n31_p}{n_0}\right) \quad (9)$$

[Formula 10]

$$M31_p = \frac{\cos\theta' 31_{in}\cos\theta 31_{out}}{\cos\theta 31_{in}\cos\theta' 31_{out}} \quad (10)$$

As illustrated in the formula (6), the emission angle $\theta 21_{out}$ of the frequency component L2 from the first dispersion element 21 depends on the temperature T. Therefore, the emission angle $\theta 22_{out}$ of the frequency component L2, which is emitted from the first dispersion element 21 and is incident on the second dispersion element 22, from the second dispersion element 22, also depends on the temperature T.

Meanwhile, as illustrated in the formula (9), the emission angle $\theta 31_{out}$ of the frequency component L2 from the first prism 31 also depends on the temperature T. Particularly, $d(n31_p/n_0)/dT$ in the formula (9) is adjusted (for example, a glass material of the first prism 31 is selected to adjust the temperature dependency of the refractive index $n31_p$), so that the temperature dependency of the emission angle $\theta 31_{out}$ can be adjusted. This is the same in the second prism 32.

That is, in the wavelength selective switch 1, the prism optical system 30 can be configured such that the temperature dependency of the optical path of the frequency component L2 decreases. In the wavelength selective switch 1, a temperature compensation function can be added to the prism optical system 30.

What is claimed is:

1. A wavelength selective switch comprising:
a dispersion optical system dispersing wavelength multiplexing light obtained by multiplexing a plurality of frequency components to the plurality of frequency components by giving a dispersion angle having nonlinear frequency dependency to each of the plurality of frequency components;
a light deflection element deflecting the plurality of frequency components;
a condensing element condensing the plurality of frequency components on the light deflection element; and
a prism optical system disposed between the dispersion optical system and the condensing element and optically coupled to the dispersion optical system and the condensing element, the prism optical system adapting spatial positions of the frequency components incident on the light deflection element to change linearly for frequencies by linearizing the frequency dependency of the dispersion angles and making incident the plurality of frequency components on the condensing element.

2. The wavelength selective switch according to claim 1, wherein the prism optical system includes at least one prism; and
the prism has a first surface on which the frequency components are incident and a second surface from which the frequency components are emitted, and linearizes the frequency dependency of the dispersion angles by incidence angles of the frequency components on the first surface, incidence angles of the frequency components on the second surface, and a refractive index.

3. The wavelength selective switch according to claim 1, wherein the prism optical system includes a plurality of prisms.

4. The wavelength selective switch according to claim 1, wherein the prism optical system includes first and second prisms,
the first prism receives the plurality of frequency components emitted from the dispersion optical system and emits the plurality of frequency components to the second prism,
the second prism receives the plurality of frequency components emitted from the first prism and emits the plurality of frequency components to the condensing element,
the second prism compensates for a difference of lengths of optical paths between the frequency components generated in the first prism, such that the plurality of frequency components incident on the condensing element cross each other at substantially the same crossing, and
a focal point of the condensing element is substantially matched with the crossing.

5. The wavelength selective switch according to claim 4, wherein the first prism and the second prism are arranged in directions opposite to each other for the optical paths of the plurality of frequency components.

6. The wavelength selective switch according to claim 4, wherein a vertex angle of the second prism is smaller than a vertex angle of the first prism.

7. The wavelength selective switch according to claim 4, wherein incidence angles of the frequency components on the second prism are smaller than incidence angles of the frequency components on the first prism.

8. The wavelength selective switch according to claim 1,
wherein the dispersion optical system includes a plurality of dispersion elements,
the plurality of dispersion elements are connected in a cascade manner such that dispersion surfaces in which the plurality of frequency components are dispersed are substantially matched with each other,
the prism optical system controls optical paths of the plurality of frequency components such that the plurality of frequency components incident on the condensing element cross each other at substantially the same crossing, and
a focal point of the condensing element is substantially matched with the crossing.

9. The wavelength selective switch according to claim 1, wherein the dispersion optical system includes a transmission-type diffraction grating.

10. A wavelength selective switch comprising:
a dispersion optical system dispersing wavelength multiplexing light to a plurality of frequency components and including a plurality of dispersion elements connected in a cascade manner such that dispersion surfaces in which the plurality of frequency components are dispersed are substantially matched with each other;
a light deflection element deflecting the plurality of frequency components;
a condensing element condensing the plurality of frequency components on the light deflection element; and
a prism optical system disposed between the dispersion optical system and the condensing element and optically coupled to the dispersion optical system and the condensing element, the prism optical system controlling optical paths of the plurality of frequency components such that the plurality of frequency components incident on the condensing element cross each other at substantially the same crossing,
wherein a focal point of the condensing element is substantially matched with the crossing.

11. The wavelength selective switch according to claim 10,
wherein the prism optical system includes at least one prism, and
the prism has a first surface on which the frequency components are incident and a second surface from which the frequency components are emitted, and controls the optical paths of the plurality of frequency components such that the plurality of frequency components incident on the condensing element cross each other at substantially the same crossing by incidence angles of the frequency components on the first surface, incidence angles of the frequency components on the second surface, and a refractive index.

12. The wavelength selective switch according to claim 10,
wherein the prism optical system includes a plurality of prisms.

13. The wavelength selective switch according to claim 10,
wherein the prism optical system includes first and second prisms,
the first prism receives the plurality of frequency components emitted from the dispersion optical system and emits the plurality of frequency components to the second prism,
the second prism receives the plurality of frequency components emitted from the first prism and emits the plurality of frequency components to the condensing element, and
the second prism compensates for a difference of lengths of the optical paths between the plurality of frequency components generated in the first prism such that the plurality of frequency components incident on the condensing element cross each other at substantially the same crossing.

14. The wavelength selective switch according to claim 13,
wherein the dispersion optical system gives a dispersion angle having nonlinear frequency dependency to each of the plurality of frequency components, and
the first prism adapts spatial positions of the frequency components incident on the light deflection element to change linearly for frequencies by linearizing the frequency dependency of the dispersion angles and making incident the plurality of frequency components on the condensing element.

15. The wavelength selective switch according to claim 13,
wherein the first prism and the second prism are arranged in directions opposite to each other for the optical paths of the plurality of frequency components.

16. The wavelength selective switch according to claim 13,
wherein a vertex angle of the second prism is smaller than a vertex angle of the first prism.

17. The wavelength selective switch according to claim 13,
wherein incidence angles of the frequency components on the second prism are smaller than incidence angles of the frequency components on the first prism.

18. The wavelength selective switch according to claim 10,
wherein the dispersion element includes a transmission-type diffraction grating.

* * * * *